United States Patent
Liu et al.

(10) Patent No.: US 11,781,916 B2
(45) Date of Patent: Oct. 10, 2023

(54) TAG ANTENNA AND PASSIVE TEMPERATURE DETECTION APPARATUS

(71) Applicant: Shenzhen HyperSynes Co., Ltd., Shenzhen (CN)

(72) Inventors: Linqing Liu, Shenzhen (CN); Jiade Yuan, Shenzhen (CN)

(73) Assignee: Shenzhen HyperSynes Co., Ltd., Shenzhen (CN)

( * ) Notice: Subject to any disclaimer, the term of this patent is extended or adjusted under 35 U.S.C. 154(b) by 358 days.

(21) Appl. No.: 17/133,670

(22) Filed: Dec. 24, 2020

(65) Prior Publication Data

US 2021/0223110 A1 Jul. 22, 2021

(30) Foreign Application Priority Data

Jan. 17, 2020 (CN) .......................... 202010053681.3
Jan. 17, 2020 (CN) .......................... 202020112842.7

(51) Int. Cl.
  *G01K 1/024* (2021.01)
  *H01Q 1/22* (2006.01)
(52) U.S. Cl.
  CPC ........... *G01K 1/024* (2013.01); *H01Q 1/2208* (2013.01)
(58) Field of Classification Search
  CPC .......... G01K 1/024; G01K 1/14; G01K 3/005; G01K 3/04; G01K 7/22; H01Q 1/2208; H01Q 1/38; H01Q 1/22; H01Q 9/065; H01Q 1/243; H01Q 1/28; H01Q 1/521; H01Q 7/00; H01Q 9/265; H01Q 1/2225; H01Q 1/48; H01Q 1/50; H01Q 13/106;

(Continued)

(56) References Cited

U.S. PATENT DOCUMENTS 4,377,733 A * 3/1983 Yamaguchi ............... G01K 1/14
  374/149
4,399,441 A * 8/1983 Vaughan ............ G06K 19/0675
  374/E1.004

(Continued)

FOREIGN PATENT DOCUMENTS

CN       1688455 A  * 10/2005 ....... G06K 19/07749
CN   202111218 U  *  1/2012

(Continued)

*Primary Examiner* — Gail Kaplan Verbitsky
(74) *Attorney, Agent, or Firm* — True Shepherd LLC; Andrew C. Cheng

(57) ABSTRACT

A tag antenna comprises a feeder comprising a first conducting wire and a second conducting wire; a first electric conductor, a second electric conductor, and a third electric conductor that are elongated; a first connecting conductor; and a second connecting conductor. The first connecting conductor is separately connected to lower ends of the first electric conductor, the second electric conductor, and the third electric conductor; the second connecting conductor is connected to at least one of the first electric conductor, the second electric conductor, and the third electric conductor; and the first connecting conductor and the second connecting conductor are spaced apart, the first conducting wire of the feeder is connected to the first connecting conductor, and the second conducting wire is connected to the second connecting conductor. The embodiments of the present disclosure further provide a passive temperature detection apparatus.

18 Claims, 7 Drawing Sheets

(58) Field of Classification Search
CPC ........ H01Q 9/0407; H01Q 9/26; H01Q 9/285;
H01Q 11/00; H01Q 9/00; H01Q 1/00;
B62D 55/08; B62D 55/24; B62D 55/32;
B60Q 9/00; B60R 16/033
USPC .............................. 374/120, 121; 340/870.17
See application file for complete search history.

(56) References Cited

U.S. PATENT DOCUMENTS

| | | | | |
|---|---|---|---|---|
| 4,746,830 | A | * | 5/1988 | Holland ................ G01S 13/755 333/195 |
| 4,865,044 | A | * | 9/1989 | Wallace .................. G01K 3/14 374/E1.004 |
| 6,698,923 | B2 | * | 3/2004 | Bedetti .................... H05B 3/68 374/149 |
| 8,228,172 | B2 | | 7/2012 | Collins et al. |
| 9,035,773 | B2 | * | 5/2015 | Petersen ............ G06K 19/0717 235/382 |
| 10,003,431 | B2 | | 6/2018 | Kummetz et al. |
| 10,505,663 | B2 | | 12/2019 | Kummetz et al. |
| 2006/0019540 | A1 | * | 1/2006 | Werthman ......... G06K 19/0717 374/E1.018 |
| 2008/0238784 | A1 | * | 10/2008 | Ohashi ................. H01Q 1/2225 343/700 MS |
| 2008/0259992 | A1 | * | 10/2008 | Sumida ................... G01K 7/32 374/E11.007 |
| 2009/0219212 | A1 | * | 9/2009 | Itoh ........................ H05K 3/247 216/13 |

FOREIGN PATENT DOCUMENTS

| | | | | | |
|---|---|---|---|---|---|
| CN | 202231143 | U | * | 5/2012 | |
| CN | 211829189 | U | | 10/2020 | |
| CN | 215184522 | U | * | 12/2021 | |
| EP | 1837798 | A2 | * | 9/2007 | ....... G06K 19/07749 |
| JP | S6053193 | U | * | 4/1985 | |
| KR | 100864836 | B1 | * | 10/2008 | |
| KR | 20090100578 | A | * | 9/2009 | |
| WO | WO-2005057794 | A2 | * | 6/2005 | ........ G06K 19/0672 |
| WO | WO-2008069459 | A1 | * | 6/2008 | .......... H01Q 1/2225 |
| WO | WO-2016072301 | A1 | * | 5/2016 | ............. G06K 19/07 |

* cited by examiner

TAG ANTENNA AND PASSIVE TEMPERATURE DETECTION APPARATUS

CROSS-REFERENCE TO RELATED APPLICATIONS

This application claims priority to Chinese Patent Application No. 202010053681.3 with a filing date of Jan. 17, 2020, and Chinese Patent Application No. 202020112842.7 with a fling date of Jan. 17, 2020. The content of the aforementioned applications, including any intervening amendments thereto, are incorporated herein by reference.

TECHNICAL FIELD

The present disclosure relates to the technical field of wireless communications, and in particular, to a tag antenna and a passive temperature detection apparatus.

BACKGROUND

The radio frequency identification (RFID) technology is an automatic identification technology that was developed in the middle and late 20th century. The RFID technology uses a reader to transmit a radio frequency signal, to identify a target object without contact by using a space electromagnetic wave. The identification process is totally automated without manual intervention. With the appearance of Internet of Things (IoT), the RFID technology becomes one of the most promising information technologies in the 21st century due to advantages such as contactless identification and fast reading. The RFID technology that works in an ultra high frequency band is especially applicable to a retail industry, warehouse management, target tracking, and the like due to advantages such as a long identification distance, low tag manufacturing costs, simultaneous identification of a plurality of tags, and fast identification. It is of great importance to research and develop the UHF RFID technology for actual production and life.

An RFID system mainly includes three parts: an electronic tag, a reader, and a system-level application. When an antenna of the reader and a read/write system are fixed, performance of a tag antenna determines performance of the whole system. There are two types of tag antennas: an active tag antenna and a passive tag antenna. The active tag antenna has a reading distance which can reach tens of meters to hundreds of meters, but has a large size and high costs, and a limited service life due to a battery. A passive tag antenna has advantages such as low manufacturing cost, simple design, and long life. In recent years, the tag antenna has a single function, and is applied to a limited environment. With continuous development of the Internet of Things, various complex environments in nature are involved to connect everything. Therefore, it is of great significance to design an RFID tag antenna that is applicable to a specific environment.

SUMMARY

In view of this, embodiments of the present disclosure provide a tag antenna.

An embodiment of the present disclosure provides a tag antenna, including:

a feeder comprising a first conducting wire and a second conducting wire; and a first electric conductor, a second electric conductor, and a third electric conductor that are elongated, a first connecting conductor, and a second connecting conductor, where the first electric conductor, the second electric conductor, and the third electric conductor are three-dimensionally distributed;

the first connecting conductor is separately connected to lower ends of the first electric conductor, the second electric conductor, and the third electric conductor;

the second connecting conductor is connected to at least one of the first electric conductor, the second electric conductor, and the third electric conductor; and the first connecting conductor and the second connecting conductor are spaced apart, the first conducting wire of the feeder is connected to the first connecting conductor, and the second conducting wire is connected to the second connecting conductor.

An embodiment of the present disclosure further provides a passive temperature detection apparatus, including:

a probe assembly comprising a probe and a temperature sensor, wherein the temperature sensor is disposed within the probe; and the tag antenna described above, wherein an end of the feeder in the tag antenna is connected to the temperature sensor, where the tag antenna receives an external first radio signal, and converts the first radio signal into electrical energy, to activate the temperature sensor to detect temperature information, and the tag antenna feeds back a second radio signal with the temperature information to the outside.

The tag antenna and the passive temperature detection apparatus provided in the embodiments of the present disclosure facilitate temperature detection at any angle.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

In the following description, specific details such as a specific system structure and a technology are provided for description instead of limitation, to thoroughly understand embodiments of the present disclosure. However, those skilled in the art should understand that the present disclosure may also be implemented in other embodiments without these specific details. In other cases, detailed descriptions of a well-known system, device, circuit, and method are omitted to avoid unnecessary details interfering with the description of the present disclosure.

The terms "first" and "second" of the embodiments of the present disclosure are only used to distinguish between related technical features and do not indicate a sequence.

To describe the technical solutions described in the embodiments of the present disclosure, specific embodiments are used for description below.

Figure 1:
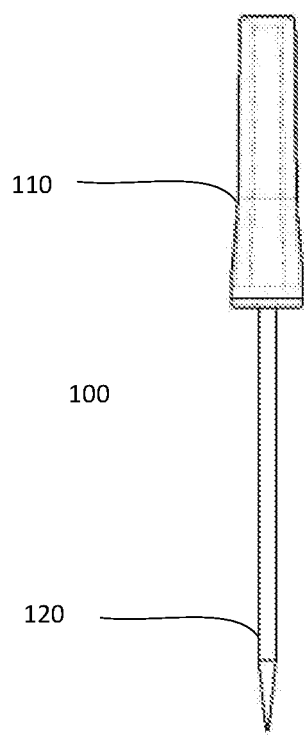
FIG. 1 is a schematic structural diagram of a passive temperature detection apparatus according to an embodiment of the present disclosure.
Figure 2:
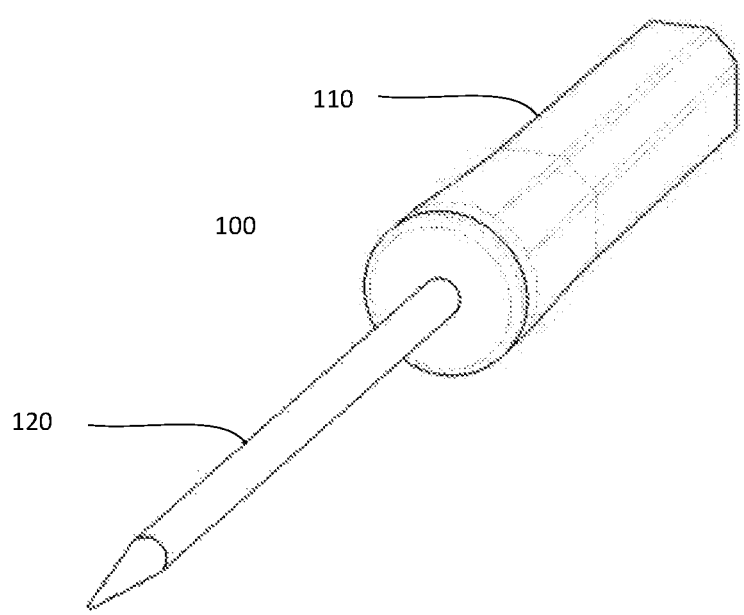
FIG. 2 is another schematic structural diagram of a passive temperature detection apparatus according to an embodiment of the present disclosure.
Figure 3:
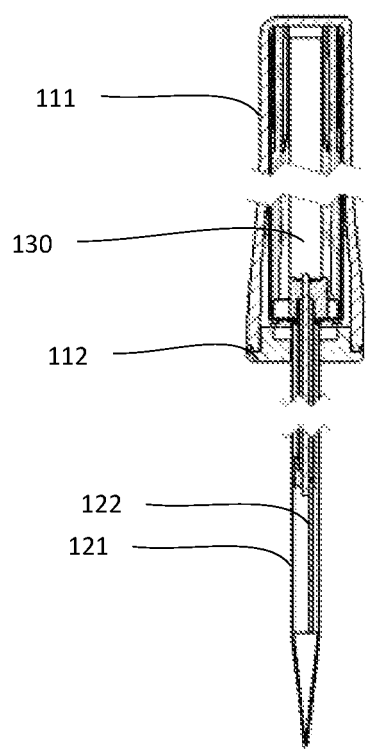
FIG. 3 is a cross-sectional view of a passive temperature detection apparatus according to an embodiment of the present disclosure.

FIG. 1 to FIG. 7 are schematic structural diagrams of a passive temperature detection apparatus according to an embodiment of the present disclosure. Detailed content is as follows:

FIG. 1 to FIG. 3 show a passive temperature detection apparatus 100 provided in an embodiment of the present disclosure. The passive temperature detection apparatus 100 includes a housing 110, a probe assembly 120, and a tag antenna 130.

In an example implementation solution, the housing 110 is made of a heat resistant material, for example, ceramic.

In an example implementation solution, the housing 110 includes an upper housing 111 and a lower housing 112. The upper housing 111 has an elongated hollow structure, and a main part of the tag antenna 130 is disposed within the upper housing 111. The lower housing 112 cooperates with the upper housing 111, to seal the upper housing 111.

The probe assembly 120 includes a probe 121 and a temperature sensor 122. As shown in FIG. 3, the probe 121 has a hollow structure, and the temperature sensor 122 is disposed within the hollow structure of the probe 121. In an example implementation solution, the probe assembly 120 may include one or more temperature sensors 122. If the probe assembly 120 includes only one temperature sensor 122, the temperature sensor 122 is disposed at a head of the probe 121 as much as possible, for example, is disposed at a tip part of the probe 121 as much as possible. If the probe assembly 120 includes a plurality of temperature sensors 122 (two or more temperature sensors 122), the plurality of temperature sensors 122 may be distributed in a length direction of the probe 121. In this case, it is easy to conveniently detect a temperature of each part of the probe 121.

According to the tag antenna 130 provided in this embodiment of the present disclosure, the tag antenna 130 is configured to: receive a first radio signal sent by an external apparatus, and convert the first radio signal into electrical energy, to activate the temperature sensor 122 to detect temperature information. The tag antenna 130 also feeds back a second radio signal with the temperature information to the outside.

In a specific implementation solution, the first radio signal is an electromagnetic wave. After receiving the electromagnetic wave, the tag antenna 130 converts the electromagnetic wave into electrical energy, to activate the temperature sensor 122 to detect the temperature information. The tag antenna 130 also feeds back an electromagnetic wave with the temperature information to the outside.

A specific structure of the tag antenna 130 is as follows:

The tag antenna 130 includes a feeder 137. The feeder 137 includes a first conducting wire 1371 and a second conducting wire 1372.

In a specific implementation solution, the feeder 137 is a coaxial feeder, the first conducting wire 1371 of the coaxial feeder is an inner conductor, and the second conducting wire 1372 is an outer conductor. Specifically, the outer conductor of the coaxial feeder is a metal tube, and the inner conductor is a metal probe. This can ensure that the passive temperature detection apparatus 100 can operate in a high temperature environment (for example, in a range of 200° C.-800° C.).

The tag antenna 130 further includes a first electric conductor 131, a second electric conductor 132, and a third electric conductor 133 that are elongated. In a specific implementation solution, the first electric conductor 131, the second electric conductor 132, and the third electric conductor 133 may be conductive sheets, conductive wires, conductive coatings, or the like (for example, metal sheets, metal wires, or metal coatings) that may be conductive.

Figure 4:
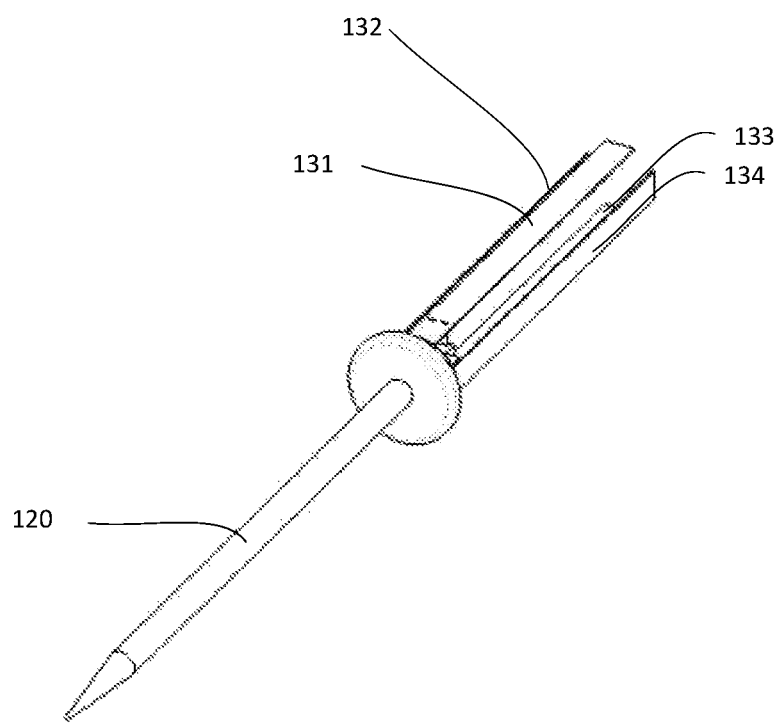
FIG. 4 is a structural diagram of a tag antenna of a passive temperature detection apparatus according to an embodiment of the present disclosure.
Figure 5:
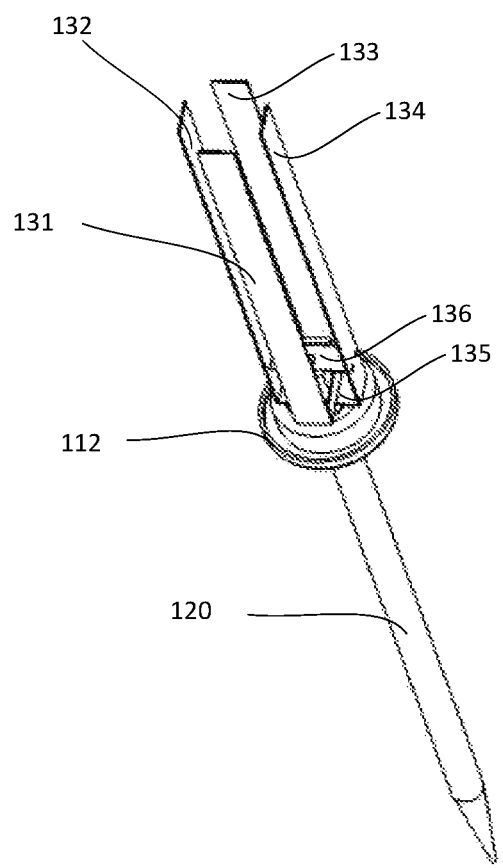
FIG. 5 is another structural diagram of a tag antenna of a passive temperature detection apparatus according to an embodiment of the present disclosure.
Figure 6:
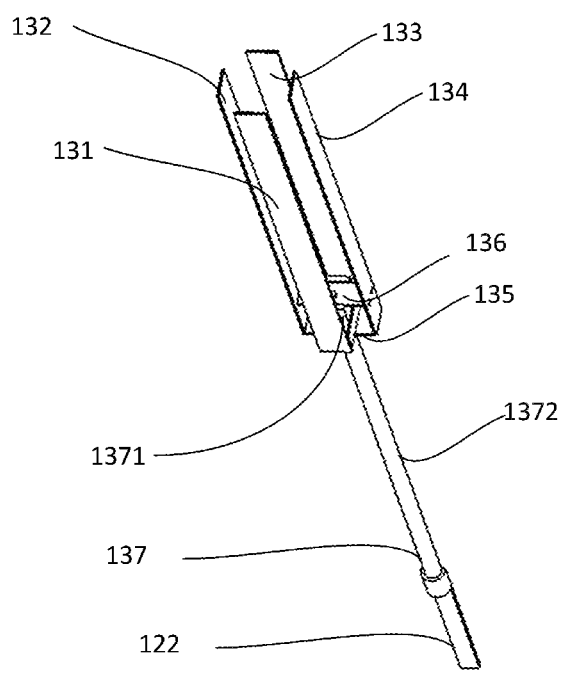
FIG. 6 is another structural diagram of a tag antenna of a passive temperature detection apparatus according to an embodiment of the present disclosure.
Figure 7:
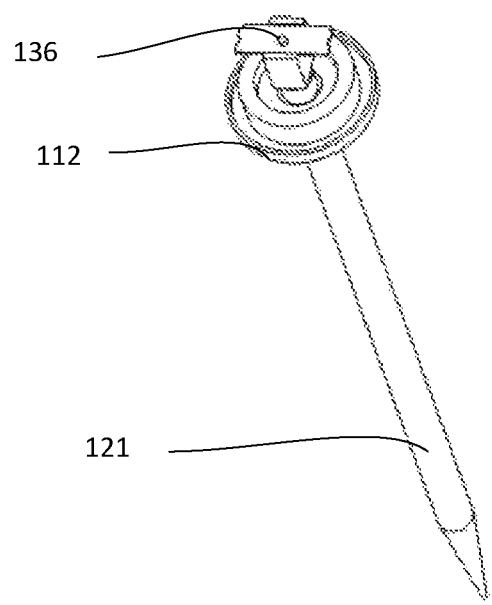
FIG. 7 is a schematic diagram of a partial structure of a passive temperature detection apparatus according to an embodiment of the present disclosure.

In a specific implementation solution, the first electric conductor 131, the second electric conductor 132, and the third electric conductor 133 may be metal sheets or metal wires that are elongated, for example, rectangular metal sheets or metal wires that are strip-shaped, as shown in FIG. 4 to FIG. 6.

In a specific implementation solution, the first electric conductor 131, the second electric conductor 132, and the third electric conductor 133 are three-dimensionally distributed. That is, the first electric conductor 131, the second electric conductor 132, and the third electric conductor 133 are not distributed on a same plane. Every two of the first electric conductor 131, the second electric conductor 132, and the third electric conductor 133 are not distributed on a same plane.

The tag antenna 130 further includes a first connecting conductor 135. The first connecting conductor 135 may be a conductive sheet, a conductive wire, a conductive coating, or the like (for example, a metal sheet, a metal wire, or a metal coating).

The first connecting conductor 135 is connected to lower ends of the first electric conductor 131, the second electric conductor 132, and the third electric conductor 133. The lower end in this embodiment of the present disclosure is a part close to and/or around the tail end of the first electric conductor 131, the second electric conductor 132, and the third electric conductor 133.

The tag antenna 130 in this embodiment of the present disclosure further includes a second connecting conductor 136. The second connecting conductor 136 is connected to at least one of the first electric conductor 131, the second electric conductor 132, and the third electric conductor 133. That is, the second connecting conductor 136 is separately connected to one or two of first electric conductor 131, the second electric conductor 132, and the third electric conductor 133.

In this embodiment of the present disclosure, the first connecting conductor 135 and the second connecting conductor 136 are spaced apart. That is, there is no direct contact between the first connecting conductor 135 and the second connecting conductor 136.

In this embodiment of the present disclosure, the first conducting wire of the feeder 137 is connected to the first connecting conductor 135, and the second conducting wire is connected to the second connecting conductor 136.

In a specific implementation solution, the first electric conductor 131, the second electric conductor 132, and the third electric conductor 133 are circumferentially and uniformly distributed. That is, the first electric conductor 131, the second electric conductor 132, and the third electric conductor 133 are circumferentially and uniformly distributed, and a mutual radian is 120 degrees.

In this embodiment of the present disclosure, a part that is of the tag antenna and that is close to a metal is a ground plane. Specifically, one or two of the first electric conductor 131, the second electric conductor 132, and the third electric conductor 133 may be close to the metal, and is/are used as a ground plane. The other two or one are/is away from the metal, and are/is used as a radiation unit. In this embodiment, the radiation unit and the ground plane of the antenna constitute four conductive side portions whose size is 80 mm×11 mm×11 mm, and an overall size of the antenna of the coaxial feeder portion is 135 mm×11 mm×11 mm. Specific sizes are as follows: A size of the four conductive side portions is 80 mm×5 mm, a size of a feeding surface is 11 mm×4 mm, a size of two same short circuit surfaces is 3 mm×5 mm, and a size of a fixed surface is 11 mm×3 mm.

FIG. 4 to FIG. 6 are schematic structural diagrams of a tag antenna 130 according to an embodiment of the present disclosure. As shown in the figure, the tag antenna 130 further includes an elongated fourth electric conductor 134. The fourth electric conductor 134 may be a conductive sheet, a conductive wire, a conductive coating, or the like (for example, a metal sheet, a metal wire, or a metal coating). The first connecting conductor 135 is connected to a lower end of the fourth electric conductor 134.

The second connecting conductor 136 is connected to at least one of the first electric conductor 131, the second electric conductor 132, the third electric conductor 133, and the fourth electric conductor 134. Tat is, the second connecting conductor 136 is connected to one to three of the first electric conductor 131, the second electric conductor 132, the third electric conductor 133, and the fourth electric conductor 134.

As shown in FIG. 4 to FIG. 6, the first connecting conductor 136 is connected to the second electric conductor 132 and the fourth electric conductor 134. In a specific implementation solution, the first electric conductor 131, the second electric conductor 132, the third electric conductor 133, and the fourth electric conductor 134 are metal sheets, and the second connecting conductor 136 is a metal sheet. The second connecting conductor 136 is separately connected to the second electric conductor 132 and the fourth electric conductor 134.

As shown in FIG. 4 to FIG. 6, the feeder is a coaxial feeder, and the inner conductor of the coaxial feeder is connected to the second connecting conductor 136.

In a specific implementation solution, the first connecting conductor 135 includes a first conductive structure and a second conductive structure that are mutually connected (which are not marked in the figure). In a specific implementation solution, the first conductive structure is separately connected to lower ends of the first electric conductor 131 and the second electric conductor 132; and the second conductive structure is separately connected to lower ends of the third electric conductor 133 and the fourth electric conductor 134.

In this embodiment of the present disclosure, the first electric conductor 131 and the second electric conductor 132 may be disposed adjacent to each other, or may be disposed opposite to each other (as shown in FIG. 4 to FIG. 6, the first electric conductor 131 and the second electric conductor 132 may be disposed adjacent to each other). Correspondingly, the third electric conductor 133 and the fourth electric conductor 134 may also be disposed opposite to each other or adjacent to each other (as shown in FIG. 4 to FIG. 6, the third electric conductor 133 and the fourth electric conductor 134 may be disposed adjacent to each other).

In a specific implementation solution, the first conductive structure, the first electric conductor 131, and the second electric conductor 132 respectively correspond to a bottom and left and right sides of a U-shaped metal sheet; and/or the second conductive structure, the third electric conductor 133, and the fourth electric conductor 134 respectively correspond to a bottom and left and right sides of a U-shaped metal sheet. In this embodiment of the present disclosure, the first electric conductor 131 and the second electric conductor 132 may be disposed opposite to each other or may be disposed adjacent to each other. In this embodiment of the present disclosure, the third electric conductor 133 and the fourth electric conductor 134 may be disposed opposite to each other or may be disposed adjacent to each other.

In this embodiment of the present disclosure, the first conductive structure, the first electric conductor 131, and the second electric conductor 132 respectively correspond to a bottom and left and right sides of a U-shaped metal wire; and/or the second conductive structure, the third electric conductor 133, and the fourth electric conductor 134 respectively correspond to a bottom and left and right sides of a U-shaped metal wire.

In a specific implementation solution, the first electric conductor 131, the second electric conductor 132, the third electric conductor 133, and the fourth electric conductor 134 may be distributed around a circumference or circumferentially and uniformly distributed.

In a specific implementation solution, the first electric conductor 131 and the third electric conductor 133 are disposed opposite to each other, the second electric conductor 132 and the fourth electric conductor 134 are disposed opposite to each other, and a radian between the first electric conductor 131 and the second electric conductor 132 ranges from 700 to 110.

A person of ordinary skill in the art may be aware that units and algorithm steps in examples described with reference to the embodiments disclosed herein can be implemented as electronic hardware or a combination of computer software and electronic hardware. Whether these functions are implemented by using hardware or software depends on the specific application of the technical solutions and design constraints. A person skilled in the art may use different methods to implement the described functions for each specific application, but such implementation should not be considered to be beyond the scope of the present disclosure.

The foregoing embodiments are only used to explain the technical solutions of the present disclosure, and are not intended to limit the present disclosure. Although the present disclosure is described in detail with reference to the foregoing embodiments, a person of ordinary skill in the art should understand that they can still modify the technical solutions described in the foregoing embodiments, or make equivalent substitutions on some technical features therein. These modifications or substitutions do not make the essence of the corresponding technical solutions deviate from the spirit and scope of the technical solutions of the embodiments of the present disclosure.

What is claimed is:

1. A tag antenna, comprising:
a feeder comprising a first conducting wire and a second conducting wire; and
a first electric conductor, a second electric conductor, and a third electric conductor that are elongated, a first connecting conductor, and a second connecting conductor, wherein the first electric conductor, the second electric conductor, and the third electric conductor are three-dimensionally distributed;

the first connecting conductor is respectively connected to lower ends of the first electric conductor, the second electric conductor, and the third electric conductor;

the second connecting conductor is connected to at least one of the first electric conductor, the second electric conductor, and the third electric conductor; and the first connecting conductor and the second connecting conductor are spaced apart, the first conducting wire of the feeder is connected to the first connecting conductor, and the second conducting wire is connected to the second connecting conductor.

2. The tag antenna according to claim 1, wherein the first electric conductor, the second electric conductor, and the third electric conductor are circumferentially and uniformly distributed.

3. The tag antenna according to claim 1, further comprising:

an elongated fourth electric conductor;

the first connecting conductor is connected to a lower end of the fourth electric conductor; and the second connecting conductor is connected to at least one of the first electric conductor, the second electric conductor, the third electric conductor, and the fourth electric conductor.

4. The tag antenna according to claim 3, wherein the first connecting conductor comprises a first conductive structure and a second conductive structure that are mutually connected;

the first conductive structure is separately connected to lower ends of the first electric conductor and the second electric conductor; and the second conductive structure is separately connected to lower ends of the third electric conductor and the fourth electric conductor.

5. The tag antenna according to claim 4, wherein the first conductive structure, the first electric conductor, and the second electric conductor respectively correspond to a bottom and left and right sides of a U-shaped metal sheet; and/or the second conductive structure, the third electric conductor, and the fourth electric conductor respectively correspond to a bottom and left and right sides of a U-shaped metal sheet.

6. The tag antenna according to claim 4, wherein the first conductive structure, the first electric conductor, and the second electric conductor respectively correspond to a bottom and left and right sides of a U-shaped metal wire; and/or the second conductive structure, the third electric conductor, and the fourth electric conductor respectively correspond to a bottom and left and right sides of a U-shaped metal wire.

7. The tag antenna according to claim 6, wherein the first electric conductor and the second electric conductor are disposed opposite to each other; and/or the third electric conductor and the fourth electric conductor are disposed opposite or adjacent to each other.

8. The tag antenna according to claim 1, wherein the feeder is a coaxial feeder, the first conducting wire is an outer conductor of the coaxial feeder, and the second conducting wire is an inner conductor of the coaxial feeder.

9. The tag antenna according to claim 8, wherein the outer conductor of the coaxial feeder is a metal tube, and the inner conductor is a metal probe.

10. A passive temperature detection apparatus, comprising:

a probe assembly comprising a probe and a temperature sensor, wherein the temperature sensor is disposed within the probe; and a tag antenna comprising:

a feeder comprising a first conducting wire and a second conducting wire; and a first electric conductor, a second electric conductor, and a third electric conductor that are elongated, a first connecting conductor, and a second connecting conductor; wherein the first electric conductor, the second electric conductor, and the third electric conductor are three-dimensionally distributed; the first connecting conductor is respectively connected to lower ends of the first electric conductor, the second electric conductor, and the third electric conductor; the second connecting conductor is connected to at least one of the first electric conductor, the second electric conductor, and the third electric conductor; and the first connecting conductor and the second connecting conductor are spaced apart, the first conducting wire of the feeder is connected to the first connecting conductor, and the second conducting wire is connected to the second connecting conductor; and an end of the feeder is connected to the temperature sensor;

the tag antenna receives an external first radio signal, and converts the first radio signal into electrical energy, to activate the temperature sensor to detect temperature information, and the tag antenna feeds back a second radio signal with the temperature information to outside.

11. The passive temperature detection apparatus according to claim 10, wherein the first electric conductor, the second electric conductor, and the third electric conductor are circumferentially and uniformly distributed.

12. The passive temperature detection apparatus according to claim 10, further comprising:

an elongated fourth electric conductor;

the first connecting conductor is connected to a lower end of the fourth electric conductor; and the second connecting conductor is connected to at least one of the first electric conductor, the second electric conductor, the third electric conductor, and the fourth electric conductor.

13. The passive temperature detection apparatus according to claim 12, wherein the first connecting conductor comprises a first conductive structure and a second conductive structure that are mutually connected;

the first conductive structure is separately connected to lower ends of the first electric conductor and the second electric conductor; and the second conductive structure is separately connected to lower ends of the third electric conductor and the fourth electric conductor.

14. The passive temperature detection apparatus according to claim 13, wherein the first conductive structure, the first electric conductor, and the second electric conductor respectively correspond to a bottom and left and right sides of a U-shaped metal sheet; and/or the second conductive structure, the third electric conductor, and the fourth electric conductor respectively correspond to a bottom and left and right sides of a U-shaped metal sheet.

15. The passive temperature detection apparatus according to claim 13, wherein the first conductive structure, the first electric conductor, and the second electric conductor respectively correspond to a bottom and left and right sides of a U-shaped metal wire; and/or the second conductive structure, the third electric conductor, and the fourth electric conductor respectively correspond to a bottom and left and right sides of a U-shaped metal wire.

16. The passive temperature detection apparatus according to claim 15, wherein the first electric conductor and the second electric conductor are disposed opposite to each other; and/or the third electric conductor and the fourth electric conductor are disposed opposite or adjacent to each other.

17. The passive temperature detection apparatus according to claim 10, wherein the feeder is a coaxial feeder, the first conducting wire is an outer conductor of the coaxial feeder, and the second conducting wire is an inner conductor of the coaxial feeder.

18. The passive temperature detection apparatus according to claim 17, wherein the outer conductor of the coaxial feeder is a metal tube, and the inner conductor is a metal probe.

* * * * *